V. C. PALMER.
AUTOMATIC HAY EJECTOR FOR SWEEP RAKES.
APPLICATION FILED SEPT. 13, 1919.
1,341,819.
Patented June 1, 1920.
2 SHEETS—SHEET 1.
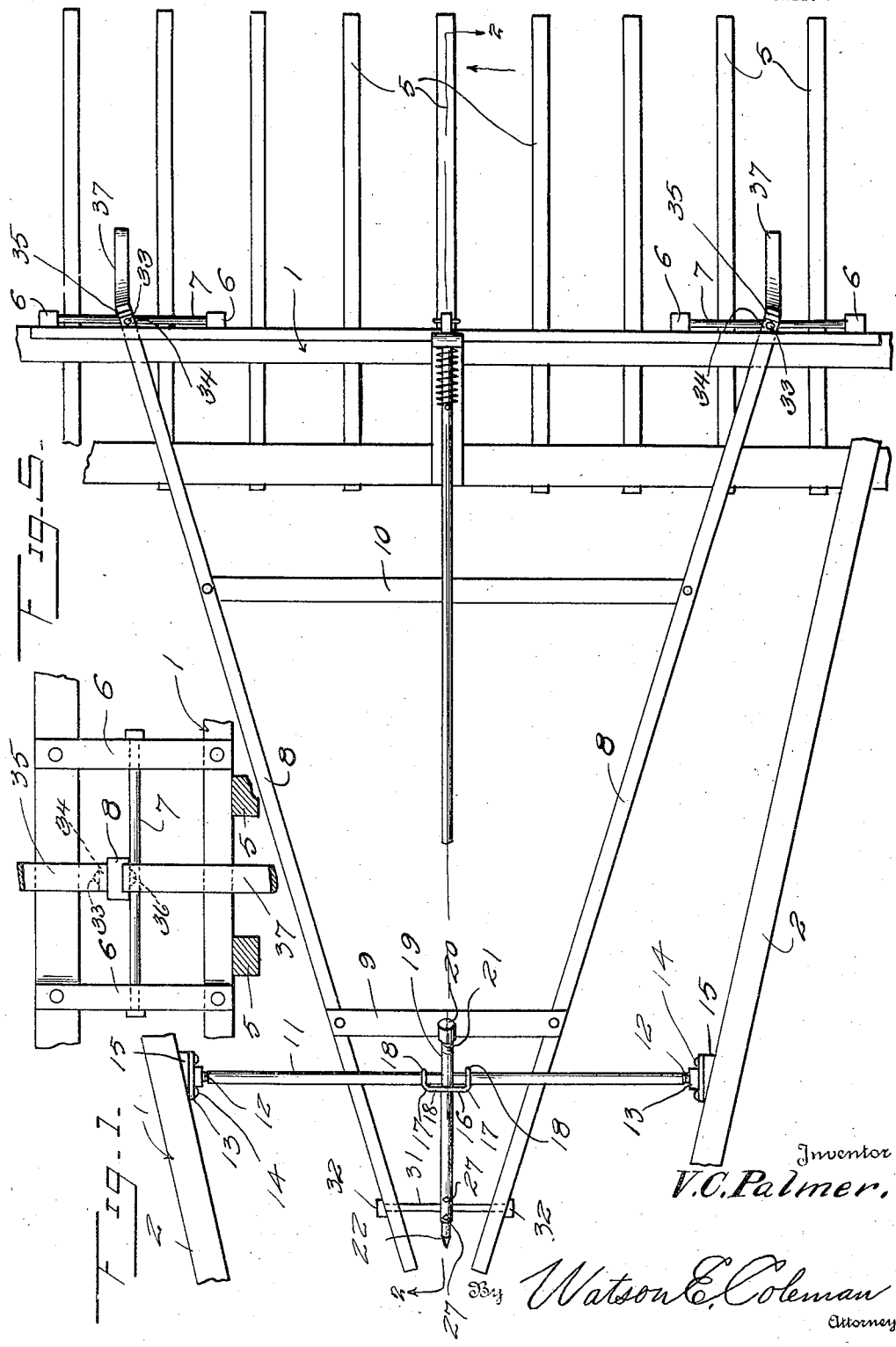

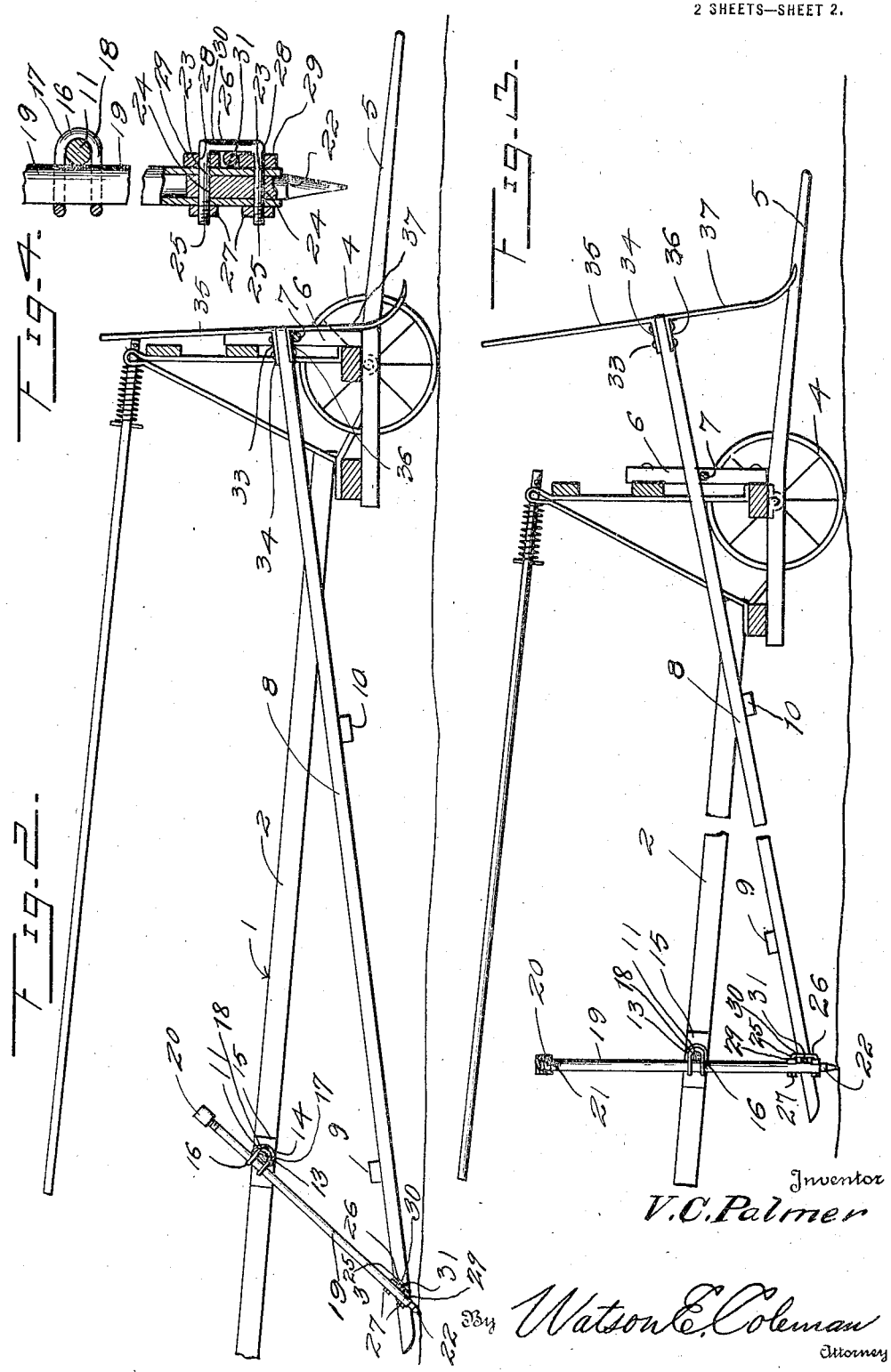

UNITED STATES PATENT OFFICE.

VICTOR C. PALMER, OF NORWOOD, COLORADO, ASSIGNOR OF ONE-THIRD TO HORACE JOSEPH AND ONE-THIRD TO JAMES F. SULLIVAN, BOTH OF NORWOOD, COLORADO.

AUTOMATIC HAY-EJECTOR FOR SWEEP-RAKES.

1,341,819.            Specification of Letters Patent.      Patented June 1, 1920.

Application filed September 13, 1919. Serial No. 323,620.

*To all whom it may concern:*

Be it known that I, VICTOR C. PALMER, a citizen of the United States, residing at Norwood, in the county of San Miguel and State of Colorado, have invented certain new and useful Improvements in Automatic Hay-Ejectors for Sweep-Rakes, of which the following is a specification, reference being had to the accompanying drawings.

This invention relates to the art of sweep rakes, and more especially to an improved hay ejector therefor, and as a primary object of the invention, it is the aim to provide a very simple, efficient and practical ejector, which may be very cheaply manufactured, and sold at a reasonable profit.

Another object of the invention is to provide a hay ejector which is automatic in every respect, light and durable in construction, and furthermore involves a construction which requires no extra draft whatever.

A further object of the invention is to provide an ejector of this kind, capable of being very easily applied, and furthermore does not weaken the rake or interfere with its operation in any way, and also is very essential in unloading sweep rakes, since it saves much time and labor.

A still further object of the invention is the provision of an ejector, in which gears or other complicated machinery (which may get out of order) are eliminated, and furthermore, in which all strains, which would cause wear or other damage, to the parts, are avoided, and furthermore, the structure of which is very easily repaired.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a plan view of the improved hay ejector, as applied to a sweep rake.

Fig. 2 is a sectional view on line 2—2 of Fig. 1, showing the position of the ejector while the rake is loaded.

Fig. 3 is a similar view, showing the position of the ejector, when unloading the sweep rake.

Fig. 4 is an enlarged detail view of the connection between the rear portion of the ejector and the frame of the rake.

Fig. 5 is an enlarged detail view of the forward end of one of the arms or beams of the ejector.

Referring more especially to the drawings, 1 designates the main frame of the sweep rake, which is provided with rearwardly extending converging beams 2. This frame is mounted upon suitable supporting wheels 4, whereby the rake may be easily moved over the surface of the ground. The frame 1 carries the usual rake teeth 5.

Carried by the frame 1 of the sweep rake are upright beams or bars 6, arranged in pairs, one pair adjacent each side of the sweep rake frame. Mounted in the upright beams or bars 6 are supporting rods 7.

The hay ejector comprises rearwardly extending converging beams or bars 8, which are supported upon the rods 7. These bars or beams 8 are braced or reinforced relatively to each other by the transverse braces 9 and 10. The majority of sweep rakes have their side beams, which are similar to those designated by the reference characters 2, arranged in converging relation to each other. However, it is obvious that these side bars or beams 2 may be made parallel.

Should this be the case, however, the method of application of the ejector to such sweep rakes would be the same as in the present case, with the exception of a few modified details.

In the present case, the side bars or beams 2, as before stated, converge rearwardly, and arranged transversely between them is a rod 11. This rod 11 has reduced ends 12, which are threaded, and are adapted to engage the threaded sockets of the plates 13. These plates 13 are bolted or otherwise secured at 14 to the wedge insert members 15, which in turn are secured to the side beams or bars 2. It is obvious that should the side bars or beams 2 be parallel, then the wedge insert members 15 may be dispensed with, and the plates 13 secured to the inner or adjacent parallel faces of the side beams.

A link 16 is provided, and this link has its sides bent, as shown at 17, so that the loops 18 of the link may engage the transverse rod 11. By means of this link 16, a connection is afforded between a rod 19, which is designed to carry the rear part of the hay ejector. The upper end of the rod 19 has a head 20 threaded thereto, as indicated at 21. By means of this head, the rod 19 is prevented from disconnecting from the transverse rod 11. However, through the medium of the link, which has its loop ends engaging the rod 11, and the side of the link engaging the rod 19, a loose connection between the rods 11 and 19 is afforded, whereby the rod 19 may move vertically, or whereby the link may move transversely on the rod 11. These rods 11 and 19 are designed to be tubular, as shown, and fitted into the lower end of the rod 19 detachably is a sharpened foot pin 22. The lower end of the rod 19 and the foot pin have registering apertures 23 and 24, which receive the legs or arms 25 of a staple 26, thereby securely attaching the foot pin into the lower end of the rod 19. Suitable nuts or the like 27 are threaded to the arms of the staple 26, so as to hold the staple securely in position. However, before inserting the arms 25 of the staple through the registering apertures 24 and 23, the arms 25 are inserted through the apertures 28 of the semi-circular plates 29, which fit partially about the tubular rod 19. The plates 29 act to space the arch portion 30 of the staple from the surface of the rod 19, so as to permit of the passage of a transverse rod or bolt 31, which is carried between the rear ends of the converging beams or bars 8 of the ejector. This rod or bolt 31 is secured in place by the nuts 32. By this connection the rear portions of the converging beams or bars 8 of the ejector are loosely connected to the lower end of the rod 19, so as to permit the rear portion of the ejector to have freedom of movement when the sweep rake is moving to the right or the left. The rear ends of the converging bars or beams 8 are rounded on their lower portions, to prevent them from catching in obstructions on the ground, when the sweep rake is being moved backwardly.

Secured to the forward portions of the side bars or beams 8 as at 33 are the feet 34 of the tines or arms 35. These tines or arms 35 rise upwardly, and act to eject the hay when the sweep rake moves rearwardly. Secured to the under faces of the side bars or beams 8 as at 36 are the right angle extending portions of the tines or arms 37. These tines or arms 37 which are located at the forward ends of the side bars or beams 8 curve downwardly and forwardly, so that they may eject the hay from the rake when the ejector is moved.

When the sweep rake is being moved forwardly or being loaded, the foot pin 22 rests or drags on the ground, and acts to hold the side bars or beams 8 close against the frame of the sweep rake, where they do not interfere with the load.

When the sweep rake is being moved rearwardly or being unloaded, the pointed or lower end of the foot pin 22 engages in the ground automatically. The side bars or beams 8 in this manner are held in a stationary position, while the tines 35 and 37 engage the hay (which has a tendency to follow the sweep rake rearwardly) and holds it in the proper place on the fork of the stacker or slings, until the sweep rake is far enough rearward to leave the teeth clean. In other words, when the sweep rake moves rearwardly, the ejector, owing to the foot pin engaging the ground or soil, is held stationary, and since the tines or arms 35 and 37 engage the hay, which is on the sweep rake, the hay is automatically ejected. Also, when the sweep rake moves rearwardly, the upper end of the rod 19 correspondingly moves, until said rod 19 is positioned on an inclination of substantially 45 degrees, in which case, the foot pin 22 may then ride rearwardly on the ground, until the sweep rake is moved forwardly again. When it engages the ground, the ejector or attachment is automatically restored to its former position.

When the sweep rake turns to the right or the left, the rear portion of the rake may swing sidewise, owing to the looseness of play between the link 16 and the staple 26. Owing to the lower part of the rod 19 being movable on the bolt or rod 31, on which the staple 26 slides, the lower part of the rod 19 may move to the right or the left, thus preventing any damage to any part of the sweep rake or ejector.

The invention having been set forth, what is claimed as new and useful is:

1. The combination with a sweep rake having its frame provided with supports, of an ejector having its forward portion mounted slidably on the said supports, said sweep rake having rearwardly extending beams, a transverse rod connecting said beams, a rod having loose and lateral slidable connections with the rear end of the ejector and provided with vertical and lateral slidable connections with said transverse rod, whereby as the sweep rake moves rearwardly, the rod of the ejector engages the ground, and causes the ejection of the hay from the rake.

2. The combination with a sweep rake having its forward portion provided with supports and having rearwardly extending side beams, of a transverse element connecting said side beams, an ejector slidably mounted on the supports and provided with ejecting tines forward of the supports, means having pivoted and lateral slidable connections with the rear end of the ejector and having vertically movable and laterally slidable connections with the transverse element, whereby as the sweep rake moves rearwardly, said means will engage the ground and cause the ejection of the hay by the tines.

3. The combination with a sweep rake having rearwardly extending side beams and provided with supports, of an ejector movably mounted upon said supports, a transverse element connecting the side bars of the sweep rake, a rod having slidable and universal connections with the rear end of the ejector, and in turn having vertical and lateral sliding connections with the transverse element, the lower end of said rod adapted to engage the ground when the sweep rake moves rearwardly, whereby the ejector may act to automatically eject the hay from the rake.

4. The combination with a sweep rake having rearwardly extending side beams and provided with supports, of an ejector movably mounted upon said supports, a transverse element connecting the side bars of the sweep rake, a rod having slidable and universal connections with the rear end of the ejector, and in turn having vertical and lateral sliding connections with the transverse element, the lower end of said rod adapted to engage the ground when the sweep rake moves rearwardly, whereby the ejector may act to automatically eject the hay from the rake, said vertical and lateral sliding connections comprising a link pivotally carried by the transverse element and having parts arching the rod carried by the ejector.

5. The combination with a sweep rake comprising a frame having rearwardly extending beams, said frame having supports mounted thereon, a transverse element connecting said beams, of an ejector slidably mounted upon said supports and comprising side beams, upwardly and downwardly extending knee engaging tines carried by the forward ends of the beams of the ejector, a link pivotally and loosely carried by the transverse element, a rod loosely passing through the arches of the link and having its lower end provided with a foot pin, and pivotal and sliding connections between said rod and the rear end of the ejector, whereby as the sweep rake moves rearwardly, the foot pin will engage the ground, and cause the ejector to operate, whereby the tines will eject the hay from the rake.

6. In an automatic hay ejector sweep rake, the combination with a rake having supports at its forward end and rearwardly extending side beams, of a transverse element connecting said side beams, an ejector mounted to slide on the supports and provided with rearwardly extending converging beams, a rod connecting the converging ends of the beams of the ejector, a second rod having loose and lateral slidable connections with the first rod, said transverse element having means pivoted thereto and being laterally movable upon said element and being adapted to receive said second rod for vertically movable and lateral sliding connections therewith, whereby as the sweep rake moves rearwardly regardless of relative position between the ejector and the rake, said second rod will engage the ground and cause the ejection of the hay from the rake.

7. The combination with a sweep rake having its frame provided with supports, of an ejector having its forward portion mounted slidably on said supports, said sweep rake having rearwardly extending beams, a transverse rod connecting said beams, the rear end of the ejector having a transverse rod, a third rod having loose and lateral slidable connections with the second rod at its lower end, said connections comprising a staple arching the second rod and passing through the third rod and secured thereto, a pointed member secured in the lower end of the third rod by means of said staple, said third rod having vertical and lateral sliding connections with the first transverse rod of the rake supporting beams whereby as the sweep rake moves rearwardly, said pointed member will engage the ground and cause the ejection of the hay from the rake.

In testimony whereof I hereunto affix my signature.

VICTOR C. PALMER.

Witnesses:
J. M. REDDICK,
GORDON M. SULLIVAN.